US008805794B1

(12) United States Patent
Hines, III et al.

(10) Patent No.: US 8,805,794 B1
(45) Date of Patent: Aug. 12, 2014

(54) AUDITING DATA IN A WIRELESS TELECOMMUNICATIONS NETWORK

(75) Inventors: Thomas E. Hines, III, Belton, MO (US); Bonny R. Angell, Overland Park, KS (US); Victoria L. Zeller, Kansas City, MO (US); Sharon Walker, Village of Loch Lloyd, MO (US); Mark S. Freiermuth, Kansas City, MO (US); Jeanna M. Green, Lee's Summit, MO (US); Hilah A. Rozier, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 724 days.

(21) Appl. No.: 12/202,776

(22) Filed: Sep. 2, 2008

(51) Int. Cl.
*G06F 7/00* (2006.01)
*G06F 17/00* (2006.01)

(52) U.S. Cl.
USPC .......................................................... 707/690

(58) Field of Classification Search
None
See application file for complete search history.

(56) References Cited

U.S. PATENT DOCUMENTS

| 6,363,138 | B1 * | 3/2002 | Aprile ............................. 379/45 |
| 7,027,931 | B1 * | 4/2006 | Jones et al. ..................... 702/19 |
| 7,609,650 | B2 * | 10/2009 | Roskowski et al. ............ 370/252 |
| 8,010,081 | B1 * | 8/2011 | Roskowski ..................... 455/406 |
| 8,122,107 | B2 * | 2/2012 | Bonar et al. .................... 709/220 |
| 8,271,828 | B2 * | 9/2012 | Blange et al. ................... 714/4.1 |
| 2003/0016174 | A1 * | 1/2003 | Anderson ....................... 342/378 |
| 2003/0028544 | A1 * | 2/2003 | Virag et al. ..................... 707/100 |
| 2003/0225604 | A1 * | 12/2003 | Casati et al. ....................... 705/7 |
| 2006/0031475 | A1 * | 2/2006 | Fuller et al. .................... 709/224 |
| 2007/0047520 | A1 * | 3/2007 | Byers et al. .................... 370/352 |
| 2007/0104183 | A1 * | 5/2007 | Bakke et al. ................... 370/352 |
| 2008/0126377 | A1 * | 5/2008 | Bush et al. ..................... 707/101 |
| 2009/0037485 | A1 * | 2/2009 | Radel et al. .................... 707/200 |
| 2009/0075635 | A1 * | 3/2009 | Russell et al. .............. 455/414.2 |
| 2009/0088132 | A1 * | 4/2009 | Politowicz .................... 455/411 |

* cited by examiner

*Primary Examiner* — Rehana Perveen
*Assistant Examiner* — Raheem Hoffler

(57) ABSTRACT

Media are provided for performing a method of auditing data associated with a wireless telecommunications network. The method includes determining whether or not to audit data associated with a given sector in a wireless coverage area in a wireless telecommunications network based off of either a sector exclusion/inclusion list or a field in a database. The method also includes comparing attributes of sectors to be audited across network elements to determine if any data inconsistencies exit. Finally, the method presents any data inconsistencies of audited sectors to a user. In an alternate embodiment, all sectors could be audited, and certain sectors could be denoted on an audit report as to indicate that this sector already has known inconsistencies or is out of service to prevent confusion and further errors.

16 Claims, 5 Drawing Sheets

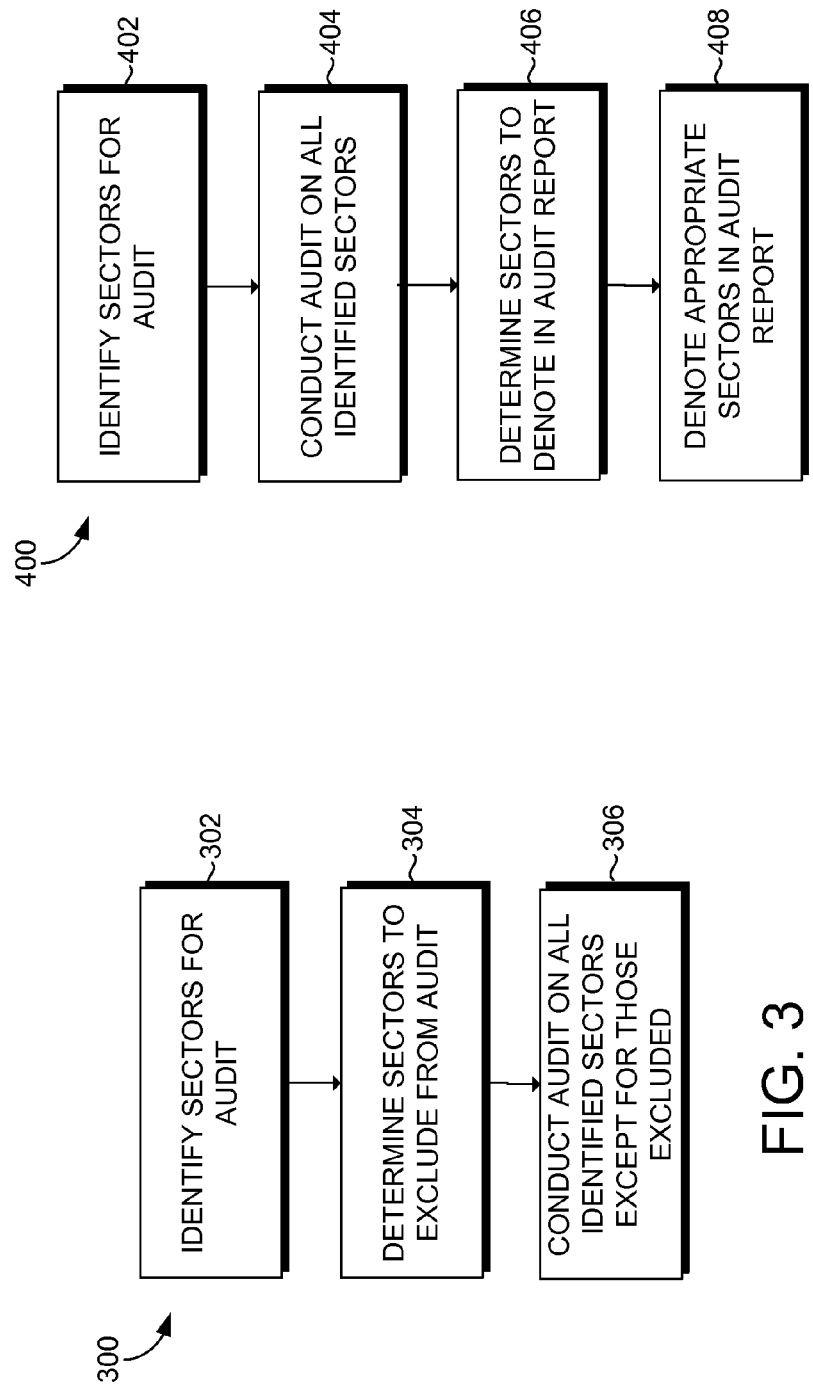

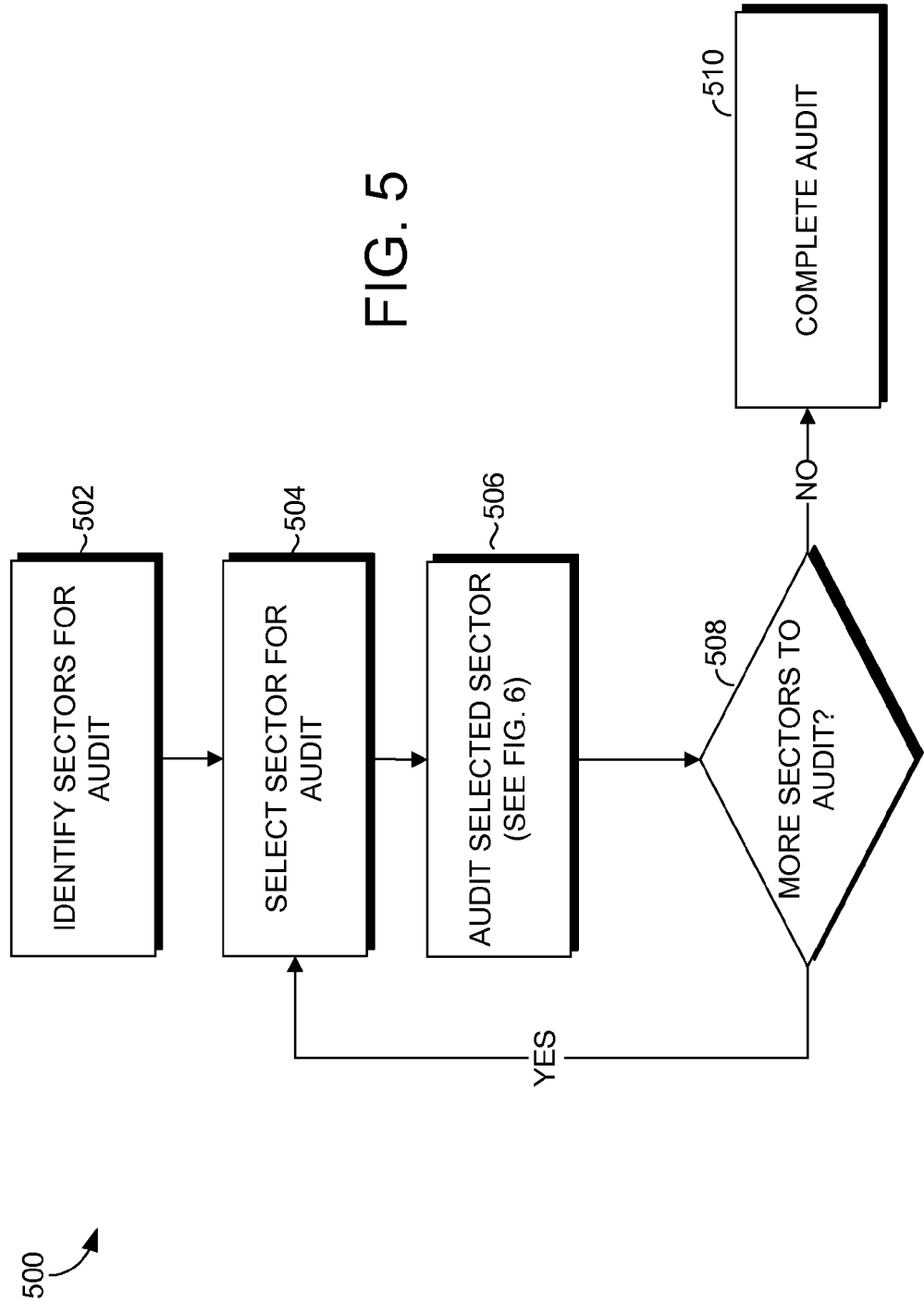

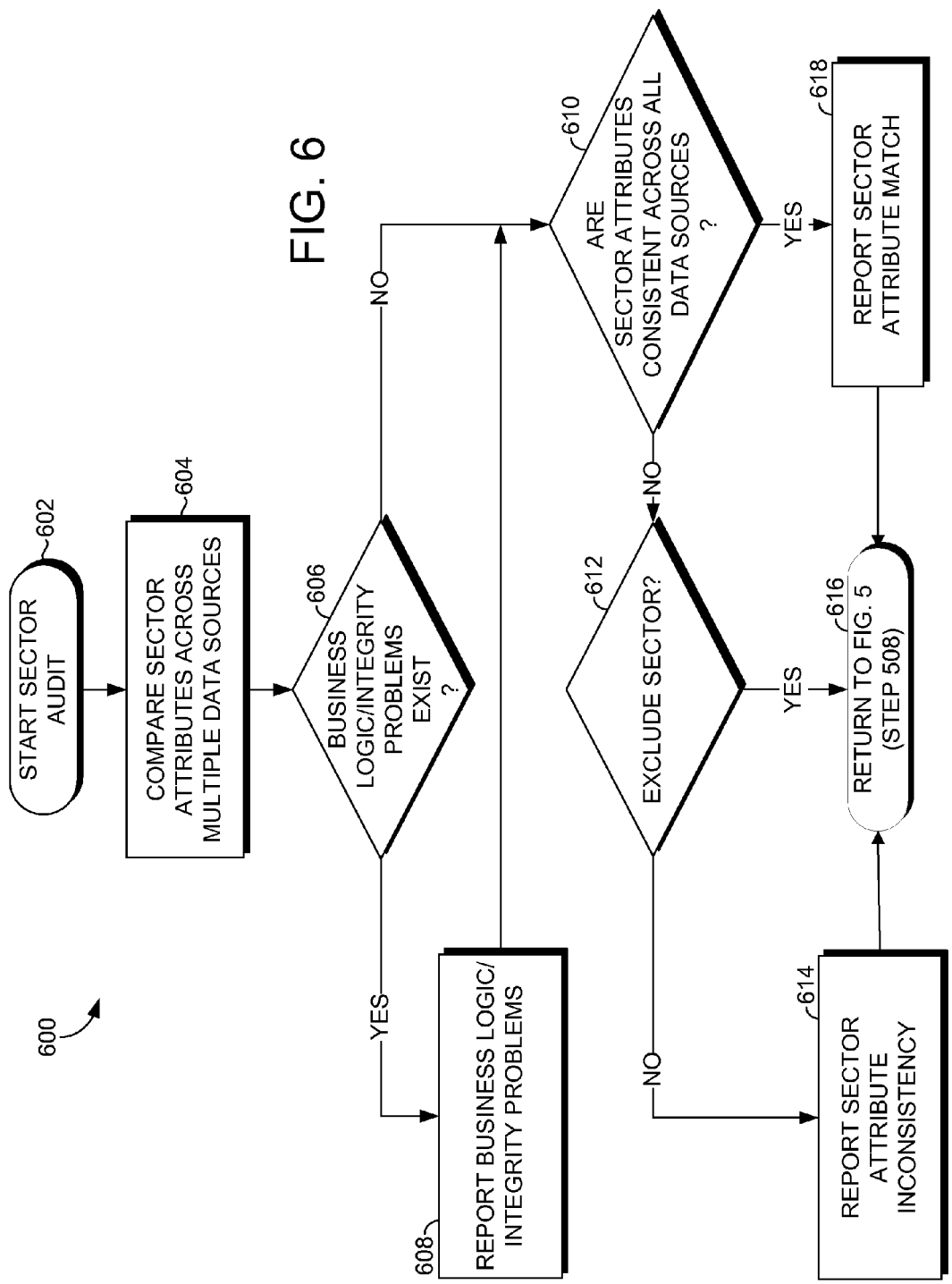

AUDITING DATA IN A WIRELESS TELECOMMUNICATIONS NETWORK

Modern wireless telecommunications networks provide a variety of network services. In order to implement these services, network systems utilize data stored across multiple network elements. This data might be stored in multiple locations, and should be consistent across sources such it is accurate regardless of where it is stored. A data audit can be conducted to ensure that the data is consistent across network elements. These audits help ensure that network services are implemented correctly, and are thus vital to providing reliable wireless telecommunications services. But sometimes faults are known. That is, data is not yet ready for production, implementation, etc. If such data were evaluated in an audit, a false sense of problems would be indicated. Thus, sometimes, certain data is to be excluded from an audit, which is the general subject of this disclosure.

SUMMARY

Embodiments of the invention are defined by the claims below, not this summary. A high-level overview of embodiments of the invention are provided here for that reason, to provide an overview of the disclosure.

In a first aspect, a set of computer-useable instructions provide a method of auditing data associated with a wireless telecommunications network, the method comprising: identifying a set of sectors of the wireless telecommunications network that might be the subject of a data audit, which the data audit is useable to identify discrepancies in information that is stored in different locations, but which information should be consistent across storage locations; determining at least one sector of the set of sectors that is to be excluded from the audit, thereby resulting in a set of one or more excluded sectors, which are sectors to be excluded from the audit; and conducting the audit on all sectors of the set of sectors except for the set of excluded sectors.

In another embodiment, a method for auditing data associated with a wireless telecommunications network is provided. The method includes referencing a first attribute value stored in a first data source, which the first attribute value is associated with a sector; comparing the first attribute value to a second attribute value stored in a second data source, which second attribute value is also associated with the sector, and which the first attribute value should be identical to the second attribute value, to determine whether the first attribute value is identical to the second attribute value, wherein a mismatch between the first and second attribute values would indicate a data inconsistency; determining whether the sector is to be excluded from a sector-mismatch report that lists errors indicative of data inconsistencies within the wireless telecommunications network; and excluding the sector from the sector-mismatch report, thereby preventing a presentation on the mismatch report of any data inconsistencies associated with the sector.

In another embodiment, a set of computer-useable instructions provides a method of auditing data associated with a wireless telecommunications network, the method comprising: referencing a first attribute value stored in a first data source, which the first attribute value is associated with a sector; comparing the first attribute value to a second attribute value stored in a second data source, which the second attribute value is also associated with the sector, and which the first attribute value should be identical to the second attribute value, wherein the comparing provides an ability to determine whether the first attribute value is identical to the second attribute value, wherein a mismatch between the first and second attribute values would indicate a data inconsistency; accessing a field in a database, wherein the field indicates inconsistencies associated with the sector are to be denoted in a sector-mismatch report that lists errors indicative of data inconsistencies within the wireless telecommunications network; and denoting the inconsistencies of the sector in the sector-mismatch report.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 3 depicts a flow diagram for a method of auditing data associated with a wireless telecommunications network;

FIG. 4 depicts a flow diagram for a method of auditing data associated with a wireless telecommunications network;

FIG. 5 depicts a flow diagram for a method of auditing data associated with a wireless telecommunications network;

FIG. 6 depicts a flow diagram for a method of auditing data associated with a wireless telecommunications network.

DETAILED DESCRIPTION

Embodiments of the present invention provide computer-readable media having computer-useable instructions embodied thereon for performing a method of auditing data associated with a wireless telecommunications network.

Embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
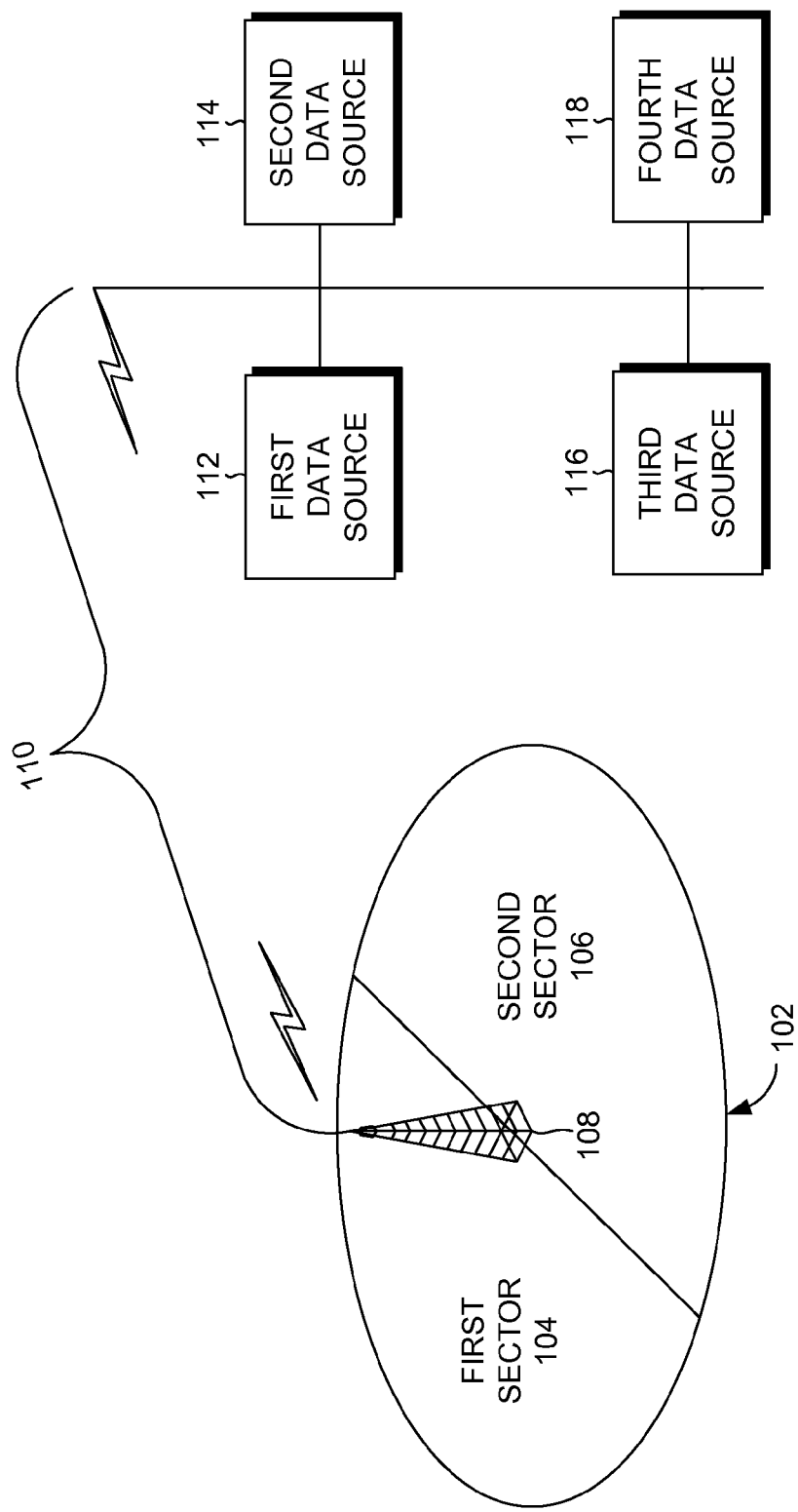
FIG. 1 depicts an illustrative environment for performing a method of auditing data associated with a wireless telecommunications network in accordance with an embodiment of the present invention.

FIG. 1 depicts an illustrative operating environment where a method for auditing data associated with a wireless telecommunications network is needed. In a wireless telecommunications network, a wireless coverage area 102 provides wireless telecommunications services in a given area. In one instance, wireless coverage area 102 is a cell, and is split into a first sector 104 and a second sector 106. The wireless coverage area may be split into more or less sectors. Additionally each sector may belong to more than one wireless coverage area. Base station 108 is in communication 110 with a plurality of data sources, such as, a first data source 112, a second data source 114, a third data source 116, and a fourth data source 118. There may be more or less data sources in communication with base station 108. In addition, the data sources may be in communication with each other. For instance, first data source 112 could be in communication with second data source 114 and fourth data source 118. However, the data sources need not be in communication with each other.

The data sources 112, 114, 116, and 118 could be any sources of wireless telecommunications network data including data sources contained in wireless telecommunication network elements. For instance, first data source 112 could be located at a mobile switching center. Second data source 114 could be located at a mobile positioning center. Third data source 116 could be a database that stores information about all network elements. Fourth data source 118 could be located at a radio network controller (RNC). The data sources contain data necessary for the completion of services in a wireless telecommunications network. Some of this data may be redundant across data sources.

One important wireless telecommunications network service is 911 service. In order for a 911 call to be completed, the call has to be routed to the proper Public Safety Access Point (PSAP). Examples of common PSAPs include sheriff's offices, 911 call centers, and any other entity that receives 911 calls. Each PSAP has different equipment capable of providing different types of 911 services. For instance, Basic 0.5 service returns a caller's phone number to the PSAP, and Phase I service returns the sector from which the 911 call originated in addition to the caller's phone number. Furthermore, Phase II service returns the exact location of the 911 caller. In order to ensure that each PSAP receives properly routed calls of the proper service type, the wireless telecommunications network must store many types of data across multiple network elements. For instance, a mobile switching center may contain information regarding which PSAP each sector should direct 911 calls to. Additionally, data regarding what type of 911 services each PSAP accepts may be spread over multiple data sources located on network elements. Some of this data is redundant, but all redundant data needs to be consistent across all data sources to ensure proper handling of 911 calls.

To help ensure data consistency, the data on these data sources needs to be periodically audited. To complete the audit, data regarding each sector is compared so that any inconsistencies may be reported. For instance, if a first data source 112 indicates that the PSAP for first sector 104 should receive type Phase II 911 calls, but a second data source 114 indicates that the PSAP for first sector 104 should receive type Basic 0.5 911 calls, then the data inconsistency would be reported so that the inconsistency could be resolved. Occasionally, it may take an extended period of time to resolve a data inconsistency. If data regarding the first sector 104 is audited while the data inconsistency is being resolved, confusion and more errors could result. Alternatively if first sector 104 is not in service, then including it in an audit may also lead to confusion. In the 911 service example, any errors that prevent proper handling of the service could have catastrophic consequences.

Figure 2:
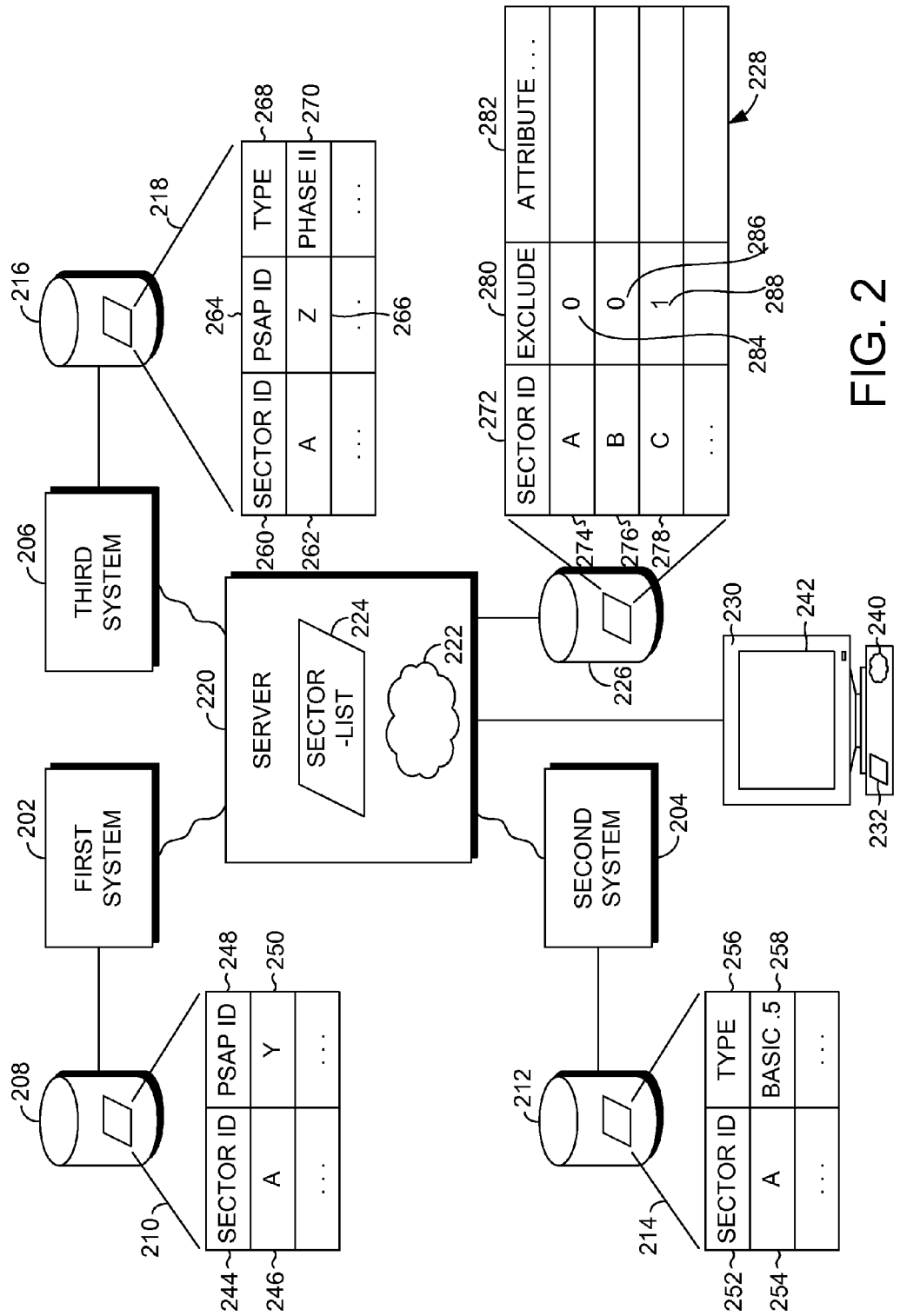
FIG. 2 depicts a more detailed view of an illustrative environment for performing a method of auditing data associated with a wireless telecommunications network in accordance with an embodiment of the present invention.

FIG. 2 depicts a more detailed illustrative operating environment for the present invention. More particularly, it depicts a detailed illustrative environment for performing a method of auditing data associated with a wireless telecommunications network. A first system 202, a second system 204, and a third system 206 may be network elements in a wireless telecommunications network such as those discussed with regard to FIG. 1. Furthering the 911 service example, first system 202 is connected to a data source 208 that contains table 210. Table 210 has a sector identifier field 244 that uniquely identifies a particular sector in a particular wireless coverage area. It also contains a PSAP identifier field 248 that identifies to which PSAP calls from each sector are to be routed. Note that additional fields could be present that are not shown.

The second system 204 is connected to a data source 212 that contains table 214. Table 214 also has a sector identifier field 252 and contains PSAP service type identifier field 256 that indicates what type of 911 service the PSAP for each sector should receive. The third system 206 is connected to data source 216 that contains table 218. Table 218 contains a sector identifier field 260, a PSAP identifier field 264, and a PSAP service type identifier field 268. While not depicted in FIG. 2, the first system 202, the second system 204, and the third system 206 may be in communication with each other. Additionally, the fields depicted in tables 210, 214, and 218 are given only for illustrative purposes; more or less fields may be present.

To audit the data contained in data sources 208, 212, and 216, first system 202, second system 204, and third system 206 are connected to a server 220. Server 220 contains computer-readable media 222 that is operable to perform a method of auditing data stored across the data sources. Server 220 need not be a single server, but may also be a plurality of servers in parallel, or a plurality of servers operable to achieve the same result. Computer-readable media 222 determines what sectors are to be audited, which may be done in a variety of ways. For instance, computer-readable media 222 may examine a sector list 224 that identifies what sectors to exclude from the audit.

Alternatively, sector list 224 may identify what sectors to include in the audit. In another embodiment, server 220 is connected to data source 226 that contains a table 228, which contains a sector identifier field 272, a field indicating whether or not to exclude the sector from the audit 280, and other fields for other sector attributes 282. The sector exclusion field 280 could indicate that the sector should be excluded in a variety of ways. For instance, a value of '0' (284, 286) as shown with regard to sectors A 274 and B 276 could indicate that these sectors should be included in an audit while a value of '1' 288 as shown with regard to sector C 278 could indicate that the sector should be excluded from the audit. The opposite situation may also apply. Other types of values could be used in the exclude field 280 such as Boolean values, string values, and many other data types that may be used to indicate whether or not a sector is to be excluded from an audit. In yet another embodiment, a user on a client device 230 could provide sector list 232 to server 220.

Once computer-readable media 222 determines what sectors to audit, the computer-readable media may begin the auditing process. In another embodiment, the computer-readable media determines that a sector should be audited after the auditing process has begun. In this embodiment, computer-readable media 222 references sector-list 224, which would contain a list of all sectors, and then individually determines whether each sector should be audited during the auditing process. Alternatively, computer-readable media 222 may audit all sectors and then determine which sectors should be included or excluded from a report. In yet another embodiment, computer-readable media 222 could determine if a given sector is to be included or excluded from a report after that sector has been audited. One skilled in the art would appreciate that many other ways exist to determine whether or not a sector should be included or excluded from an audit report.

Once the audit has begun, computer-readable media 222 may compare data regarding sector A, for instance, across all data sources. For example, table 210 depicts sector A 246 having a PSAP identifier of Y 250. Table 214 in data source 212 depicts sector A 254 having a 911 service type of Basic 0.5 258. Table 218 in data source 216 shows sector A 262 having a PSAP identifier of Z 266 and a 911 service type of Phase II 270. Therefore, inconsistencies exist in the data regarding sector A across the data sources. Assuming that sector A is not to be excluded from the audit, these inconsistencies would be reported to a user on client device 230. However, if sector A is to be excluded, the inconsistencies may not be reported.

Client device 230 may contain computer-readable media 240 operable to complete a portion or all of the processing described above in reference to computer-readable media 222. Additionally, computer-readable media 240 may be operable to allow users to add, update, or delete sectors on sector lists. However, computer-readable media 222 may also be operable to complete this as well. For example, computer-readable media 222 may be operable to present a web interface to client device 230 where users may add, update, or delete sectors on sector lists.

Once the audit is complete, computer-readable media 222 or computer-readable media 240 may generate an audit report to display to a user on user interface 242 on client device 230.

FIG. 3 depicts a flow diagram of a method 300 for auditing data associated with a wireless telecommunications network. In step 302, sectors are identified for the data audit. This may be accomplished in a variety of ways. For instance, all sectors may be available for audit, a user may provide a list of sectors for the audit, or only sectors meeting certain criteria could be eligible for audit. In step 304, sectors to exclude from the audit are identified. Note that this may be done before sectors are identified for the audit in step 302. Sectors may be identified for exclusion in a variety of ways. As discussed in reference to FIG. 2, a sector list may identify what sectors to exclude from the audit, or the value of a field in a database may determine if a sector is excluded. Sectors may be excluded from the audit for a variety of reasons including excluding sectors with known inconsistencies, excluding sectors that are not in service, or excluding sectors that do not provide the particular service whose data is being audited. In step 306, an audit is conducted on all identified sectors except for those to be excluded. Once the audit is complete, an audit report may be provided for users as described previously. The audit report may contain information identifying existing data inconsistencies across network elements.

FIG. 4 depicts an alternate embodiment of a flow diagram for a method for auditing data associated with a wireless telecommunications network. In step 402, sectors are identified for audit, and in step 404 an audit is conducted on all identified sectors as discussed before. After the audit is complete, it is determined in step 406 that certain sectors should be denoted in an audit report. The sectors denoted could be equivalent to the sectors to exclude from the audit report as discussed in the previous embodiment. Alternatively, a denoted sector could be equivalent to a sector to include in the audit report. The denoting of sectors in the audit report could be done in a variety of ways such as flagging information regarding a sector, varying the formatting of the information regarding the sector, or just not presenting the information regarding a sector in the report. Varying the formatting of the information regarding a sector, could include italicizing the information, bolding it, underlining it, changing the font size, changing the colors, and similar means. In step 408, the appropriate sectors are denoted in the report as described above.

FIG. 5 gives flow diagram for an alternate embodiment for a method 500 of auditing data associated with a wireless telecommunications network. In step 502, sectors are identified for the audit as discussed previously with regard to steps 302 and 402 in FIGS. 3 and 4 respectively. In step 504, a sector is selected for the audit and is then audited in step 506. The individual sector audit process is described more thoroughly in FIG. 6. After the sector is audited, the system determines if there are more sectors to audit in step 508. If there are more sectors to audit, then another sector is selected in step 504, but if there are not more sectors to audit, the audit is completed in step 510. Upon completion of the audit, an audit report may be presented to a user as previously discussed.

FIG. 6 expands upon step 506 of FIG. 5 and depicts a flow diagram for a method 600 of auditing the data regarding a single sector. In step 602, the audit of the sector selected in step 504 begins. In step 604, the system compares sector attributes across multiple data sources as discussed previously with respect to FIGS. 1 and 2. In step 606, any business logic or integrity problems are identified. In one instance, a business logic problem may be that settings in one system conflict with settings in another, which would allow a call to be delivered to its destination, but in an incorrect manner or "phase". Any business logic or integrity problems found are reported in step 608. In step 610, it is determined if all sector attributes are consistent across all data sources. If they are not consistent, the system determines whether or not to exclude the sector in step 612. If the sector is not to be excluded, the sector attribute inconsistency is reported in step 614, and then the system may move on to the next sector if applicable in step 616. If the sector of step 612 is to be excluded, then at step 616, processing reverts to step 602 to progressively address all sectors of interest. Returning to step 610, if the sector attributes are consistent across all data sources, then the sector attribute match may be reported in step 618, and at step 616, processing reverts to step 602 to progressively address all sectors of interest.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more computer-readable media having computer-useable instructions embodied thereon for performing a method of auditing data associated with a wireless telecommunications network, the method comprising:

identifying a set of sectors of the wireless telecommunications network that might be the subject of a data audit, the set of sectors being a subset of all sectors in a wireless telecommunications network, each of the sectors in the set being associated with at least a portion of a coverage area of a cell in the wireless telecommunications network, the data audit being useable to identify discrepancies in information associated with each of the sectors in the set respectively, the information being stored in a plurality of different locations;

determining at least one sector of the set of sectors that is to be excluded from the audit by referencing a list of identified sectors, thereby resulting in a set of one or more excluded sectors, wherein the set of one or more excluded sectors includes at least one of sectors not in service or sectors that do not provide the particular service whose data is being audited;

excluding the set of one or more excluded sectors from the audit;

conducting the audit on all sectors of the set of sectors except for the sectors in the set of one or more excluded sectors by comparing the information stored in each of the plurality of different locations for each of the sectors in the set of sectors that is not in the set of one or more excluded sectors; and denoting discrepancies in a sector-mismatch report.

2. The media of claim 1, wherein the sectors are subsections of a wireless coverage area in the wireless telecommunications network.

3. The media of claim 1, wherein the information stored in different locations includes at least one attribute related to the set of sectors.

4. The media of claim 1, wherein the conducting includes:
determining whether a first sector in the set of sectors is in the set of excluded sectors;
when the first sector is in the set of excluded sectors, excluding the first sector; but
when the first sector is not in the set of excluded sectors, continuing the audit, including the first sector.

5. The media of claim 1, wherein the conducting includes identifying inconsistencies on all sectors of the set of sectors except for the set of excluded sectors.

6. The media of claim 1, wherein the data to be audited is 911 service data.

7. The media of claim 6, wherein the 911 service data comprises data identifying what type of 911 service each of a plurality of Public Safety Access Points is equipped to provide.

8. One or more computer-readable media having computer-useable instructions embodied thereon for performing a method of auditing data associated with a wireless telecommunications network, the method comprising:

determining at least one sector that is to be excluded from an audit, thereby resulting in a set of one or more excluded sectors, wherein the sectors to be excluded are not in service or do not provide a particular service whose data is being audited;

excluding, from the audit, the set of one or more excluded sectors;

referencing a first attribute value stored in a first data source, the first attribute value being associated with a sector of a cell in a wireless telecommunication network that is not in the set of one or more excluded sectors;

comparing the first attribute value to a second attribute value stored in a second data source, the second attribute value being associated with the sector;

determining that there is a mismatch between the first and second attribute values, the mismatch indicating a data inconsistency; and denoting the sector in a sector-mismatch report that lists errors indicative of data inconsistencies within the wireless telecommunications network.

9. The media of claim 8, wherein the sector is a subsection of a wireless coverage area in the wireless telecommunications network.

10. The media of claim 8, wherein determining whether the sector is to be excluded from the sector-mismatch report includes referencing a list of identified sectors to be excluded.

11. The media of claim 8, wherein determining whether the sector is to be excluded from the sector-mismatch report includes accessing field in a database, wherein the field indicates that the sector is to be excluded from the sector-mismatch report.

12. One or more computer-readable media having computer-useable instructions embodied thereon that, when executed, perform a method of auditing data associated with a wireless telecommunications network, the method comprising:

determining at least one sector that is to be excluded from an audit, thereby resulting in a set of one or more excluded sectors, wherein the sectors to be excluded are not in service or do not provide a particular service whose data is being audited;

excluding, from the audit, the set of one or more excluded sectors;

referencing a first attribute value stored in a first data source, the first attribute value being associated with a sector that is not in the set of one or more excluded sectors;

comparing the first attribute value to a second attribute value stored in a second data source, the second attribute value being associated with the sector;

identifying a mismatch between the first and second attribute values that indicates a data inconsistency;

accessing a field in a database that indicates inconsistencies associated with the sector are to be denoted in a sector-mismatch report that lists errors indicative of data inconsistencies within the wireless telecommunications network; and denoting the inconsistencies of the sector in the sector-mismatch report, the sector-mismatch report including an entry for the sector, the entry including a visual indication that is different from one or more other entries that are not denoted.

13. The media of claim 12, wherein the sector is a subsection of a wireless coverage area in the wireless telecommunications network.

14. The media of claim 12, wherein the denoting the inconsistencies is accomplished by flagging the inconsistencies on the mismatch report.

15. The media of claim 12, wherein the denoting the inconsistencies is accomplished by changing the font of the inconsistencies on the mismatch report.

16. The media of claim 12, wherein the denoting the inconsistencies is accomplished by not presenting the inconsistencies on the mismatch report.

* * * * *